US009925657B1

(12) United States Patent
Kao

(10) Patent No.: US 9,925,657 B1
(45) Date of Patent: Mar. 27, 2018

(54) TOOL-HANGING RACK

(71) Applicant: Jui-Chien Kao, Taichung (TW)

(72) Inventor: Jui-Chien Kao, Taichung (TW)

( * ) Notice: Subject to any disclaimer, the term of this patent is extended or adjusted under 35 U.S.C. 154(b) by 0 days.

(21) Appl. No.: 15/442,476

(22) Filed: Feb. 24, 2017

(51) Int. Cl.
*B25H 3/04* (2006.01)
*F16M 13/02* (2006.01)
*A47B 95/00* (2006.01)

(52) U.S. Cl.
CPC ............. *B25H 3/04* (2013.01); *A47B 95/008* (2013.01); *F16M 13/02* (2013.01)

(58) Field of Classification Search
CPC .. B25H 3/04; B25H 3/003; B25H 3/06; A47F 7/0028; A47B 95/008; F16M 13/02
USPC .......................................... 211/70.6; 206/378
See application file for complete search history.

(56) References Cited

U.S. PATENT DOCUMENTS 5,645,177 A * 7/1997 Lin .......................... B25H 3/04 206/378
6,168,018 B1 * 1/2001 Ramsey ................... B25H 3/06 206/378
6,488,151 B2 * 12/2002 Ramsey ................... B25H 3/06 206/378
6,637,605 B2 * 10/2003 Ernst ...................... B25H 3/003 206/378
7,198,158 B2 * 4/2007 Kao ........................ A47F 5/083 211/70.6
7,753,216 B2 * 7/2010 Kao ......................... B25H 3/04 211/70.6
7,798,339 B2 * 9/2010 Brooks .................. G11B 33/02 211/103
7,954,652 B2 * 6/2011 Kao ...................... A47F 7/0028 211/106.01
8,517,188 B2 * 8/2013 Kao ......................... B25H 3/06 211/70.6
9,186,790 B1 * 11/2015 Kao ......................... B25H 3/06
9,452,524 B1 * 9/2016 Kao ......................... B25H 3/04
9,522,467 B1 * 12/2016 Kao ...................... A47F 7/0028
9,538,862 B2 * 1/2017 Kao .......................... A47F 5/08
9,539,721 B1 * 1/2017 Kao ......................... B25H 3/04
9,662,781 B1 * 5/2017 Kao ....................... B25H 3/003
9,694,491 B1 * 7/2017 Kao ......................... B25H 3/04
2003/0019775 A1 * 1/2003 Ernst ...................... B25H 3/003 206/378
2006/0118499 A1 * 6/2006 Kao ........................ A47F 5/083 211/70.6

(Continued)

FOREIGN PATENT DOCUMENTS

GB 2455117 A * 6/2009 ........... A47F 5/0838

*Primary Examiner* — Patrick D Hawn
(74) *Attorney, Agent, or Firm* — Pai Patent & Trademark Law Firm; Chao-Chang David Pai

(57) ABSTRACT

A tool-hanging rack has a rail frame and at least one tool mount. The rail frame has a back plate, two rails, and a positioning board. The rails are disposed on a side face of the back plate and are parallel with each other. Each rail has a connecting segment and a rail segment. The connecting segment has a first end connected with the side face of the back plate and a second end. The rail segment is connected with the second end of the connecting segment and has a side face facing the side face of the other rail and a positioning groove defined in the side face and extending along a longitudinal direction of the rail. The positioning board is mounted in the positioning grooves. The at least one tool mount is mounted slidably on the two rails of the rail frame.

19 Claims, 14 Drawing Sheets

(56) References Cited

U.S. PATENT DOCUMENTS

| | | | | |
|---|---|---|---|---|
| 2009/0090644 A1* | 4/2009 | Kao | ......................... | B25H 3/04 206/373 |
| 2009/0134288 A1* | 5/2009 | Kao | ......................... | B25H 3/04 248/214 |
| 2012/0138553 A1* | 6/2012 | Kao | ......................... | B25H 3/06 211/70.6 |
| 2015/0336262 A1* | 11/2015 | Kao | ......................... | B25H 3/06 206/378 |
| 2016/0096264 A1* | 4/2016 | Kao | ......................... | B25H 3/06 206/378 |

* cited by examiner

TOOL-HANGING RACK

BACKGROUND OF THE INVENTION

1. Field of the Invention

The present invention relates to a tool-hanging rack, and more particularly to a tool-hanging rack that can position tool mounts separately and firmly.

2. Description of Related Art

A conventional tool-hanging rack comprises a rail frame and at least one tool mount. The rail frame comprises a back plate and two rails. The two rails are formed on a side face of the back plate and are parallel with each other. The at least one tool mount is mounted slidably on the two rails and is applied to hold a tool, such as a screwdriver or a wrench.

However, because the rails are spaced from each other, the rails are pressed toward each other when the at least one tool mount is mounted on the rails. Consequently, the rails of the conventional tool-hanging rack cannot provide a push force to the tool mount, such that the tool mount cannot be positioned at a desired position firmly relative to the rail frame.

To overcome the shortcomings, the present invention tends to provide a tool-hanging rack to mitigate or obviate the aforementioned problems.

SUMMARY OF THE INVENTION

The main objective of the invention is to provide a tool-hanging rack that can position a tool mount firmly.

The tool-hanging rack has a rail frame and at least one tool mount. The rail frame has a back plate, two rails, and a positioning board. The rails are disposed on a side face of the back plate and are parallel with each other. Each rail has a connecting segment and a rail segment. The connecting segment has a first end connected with the side face of the back plate and a second end opposite the first end. The rail segment is connected with the second end of the connecting segment and has a side face facing the side face of the rail segment of the other rail and a positioning groove defined in the side face and extending along a longitudinal direction of the rail. The positioning board is mounted in the positioning grooves in the two rails. The at least one tool mount is mounted slidably on the two rails of the rail frame.

Other objects, advantages and novel features of the invention will become more apparent from the following detailed description when taken in conjunction with the accompanying drawings.

DETAILED DESCRIPTION OF PREFERRED EMBODIMENT

Figure 1:
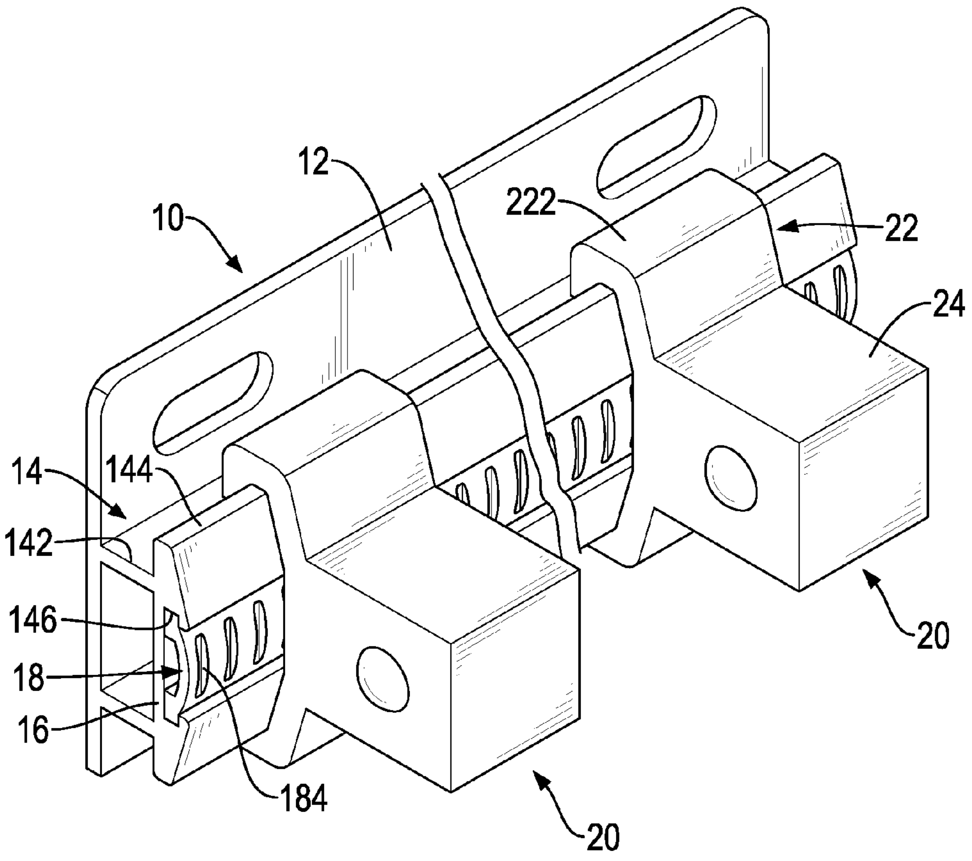
FIG. 1 is a partial perspective view of a first embodiment of a tool-hanging rack in accordance with the present invention.
Figure 2:
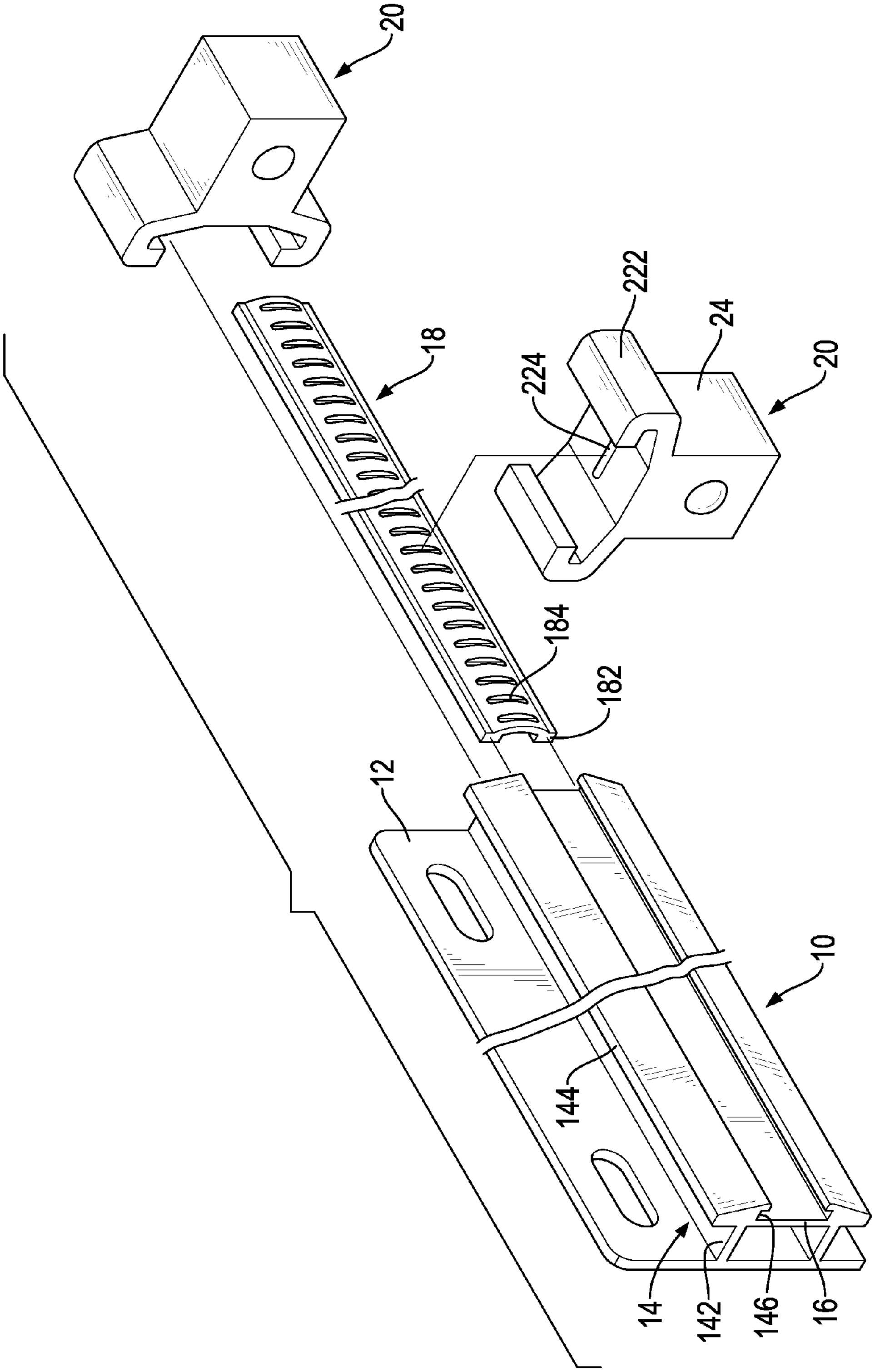
FIG. 2 is an exploded perspective view the tool-hanging rack in FIG. 1.
Figure 3:
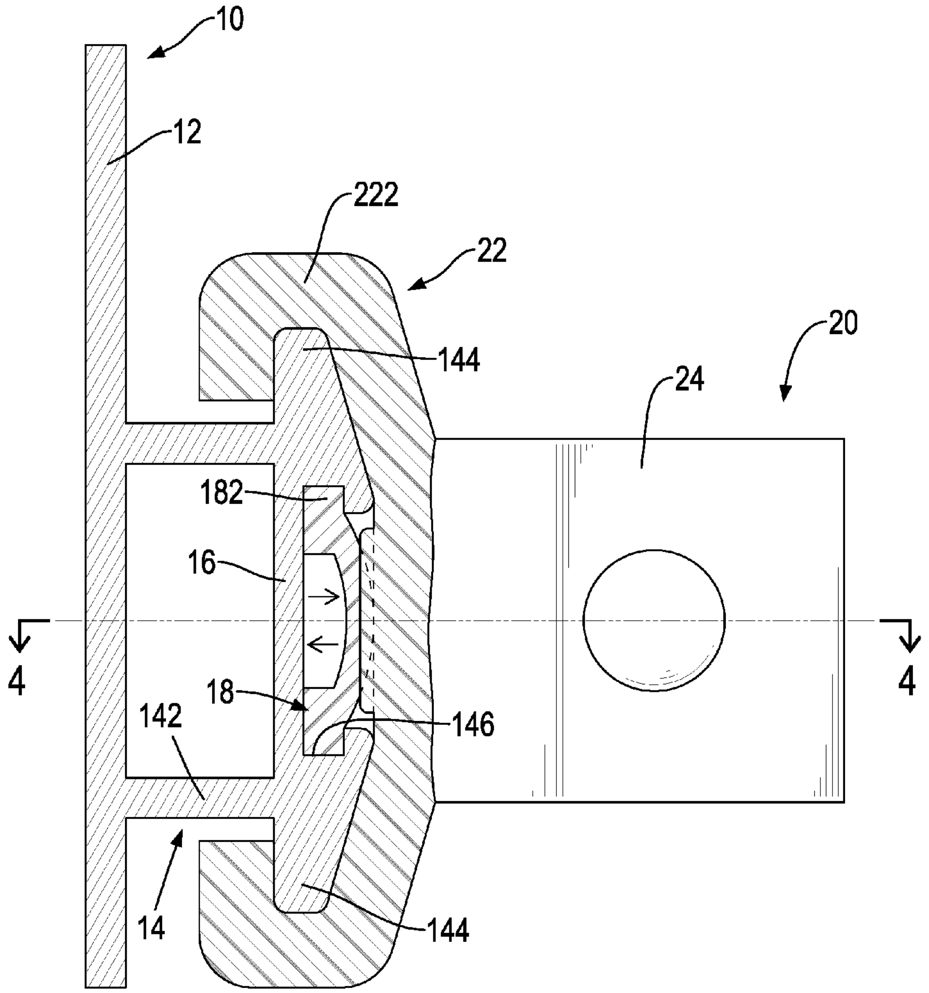
FIG. 3 is an enlarged side view in partial section of the tool-hanging rack in FIG. 1.
Figure 4A:
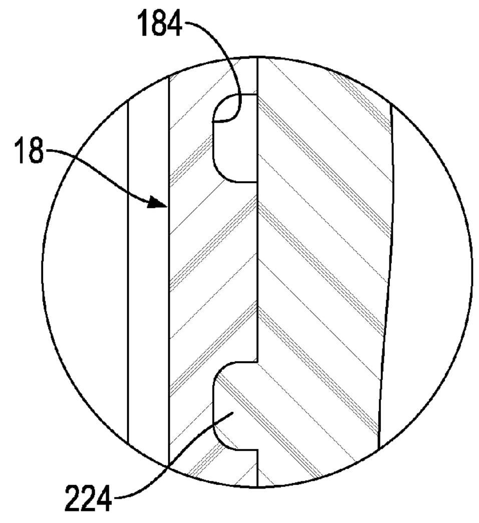
FIG. 4A is an enlarged cross sectional top view of the tool-hanging rack in FIG. 4.
Figure 4:
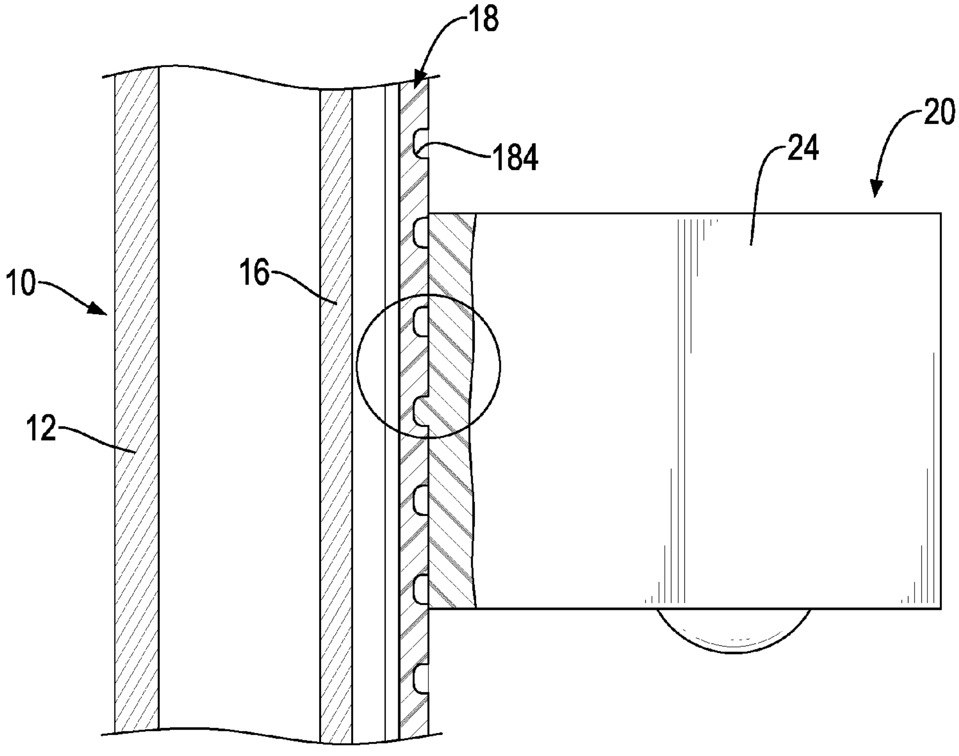
FIG. 4 is an enlarged top view in partial section of the tool-hanging rack along the line 4-4 in FIG. 3.

With reference to FIGS. 1 to 4, a tool-hanging rack in accordance with the present invention comprises a rail frame 10 and at least one tool mount 20.

The rail frame 10 comprises a back plate 12, two rails 14, and a positioning board 18. The two rails 14 are disposed on a side face of the back plate 12 and are parallel with each other. Each rail 14 comprises a connecting segment 142 and a rail segment 144. The connecting segment 142 has a first end connected with the side face of the back plate 12 and a second end opposite the first end. The rail segment 144 is connected with the second end of the connecting segment 142 and has a side face and a positioning groove 146. The side faces of the rail segments 144 of the two rails 14 face each other. The positioning groove 146 is defined in the side face of the rail segment 144 and extends along a longitudinal direction of the rail 14. In addition, a face of the rail segment 144 opposite the connecting segment 142 is an inclined surface. The back plate 12 may further have a supporting board 16 mounted between and connected with the rails 14.

The positioning board 18 is mounted in the positioning grooves 146 in the two rails 14. Preferably, the positioning board 18 has a curved cross section. The positioning board 18 further has two side edges and two rail ribs 182 formed respectively on the side edges of the positioning board 18 and mounted respectively in the positioning grooves 146 in the two rails 14. The positioning board 18 has multiple first engaging portions 184 formed on a side of the positioning board 18 opposite the back plate 12 and aligned at spaced intervals. In the first embodiment, each first engaging portion 184 is an elongated recess.

Figure 14:
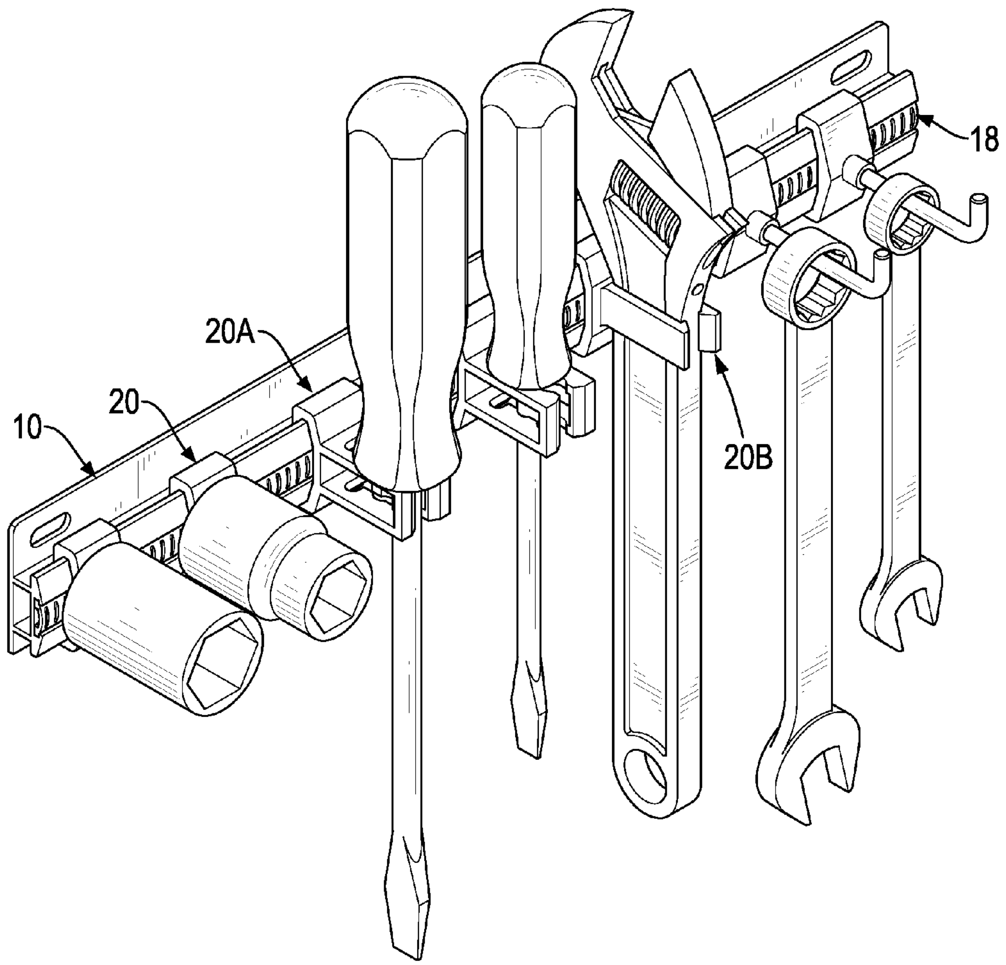
FIG. 14 is an operational exploded perspective view of a tool-hanging rack in accordance with the present invention.

The at least one tool mount 20 is mounted slidably on the two rails 14 of the rail frame 10. Each tool mount 20 comprises a clamping segment 22 and a mounting segment 24. The clamping segment 22 has two ends and two clamping hooks 222 formed respectively on the ends of the clamping segment 22. The mounting segment 24 is formed on and protrudes from a side of the clamping segment 22 opposite the back plate 12. With further reference to FIG. 14, with the mounting segment 24, a tool, such as a screwdriver, a wrench or a sleeve can be hung on the mounting segment 24. In the first embodiment, the mounting segment 24 is a cubic block and has an engaging ball mounted on one side of the mounting segment 24. In addition, a second engaging portion 224 is formed on a side of the clamping segment 22 facing the back plate 12 and is selectively engaged with one of the first engaging portions 184 on the positioning board 18. In the first embodiment, the second engaging portion 224 of each tool mount 20 is an elongated rib.

With the clamping hooks 222 of each tool mount 20 clamping the rail segments 144 of the two rails 14, the tool mount 20 is slidably mounted on the rails 14 and is moveable relative to the back plate 12. With the arrangement of the positioning board 18 and the supporting board 16 between the rails 14, the rails 14 can be kept from moving toward each other when pressed by the clamping segments 22 of the tool mounts 20. The positioning board 18 can provide a pushing force to the rails 14, such that the engagement between the rails 14 and each tool mount 20 is firm. Consequently, the tool mounts 20 can be kept from moving relative to the back plate 12 unintentionally. In addition, because the second engaging portion 224 on each tool mount 20 is selectively engaged with one of the first engaging portions 184 on the positioning board 18, the positioning effect to the tool mounts 20 relative to the back plate 12 is improved and the tool mounts 20 can be securely positioned on any desired position relative to the back plate 12.

Figure 5:
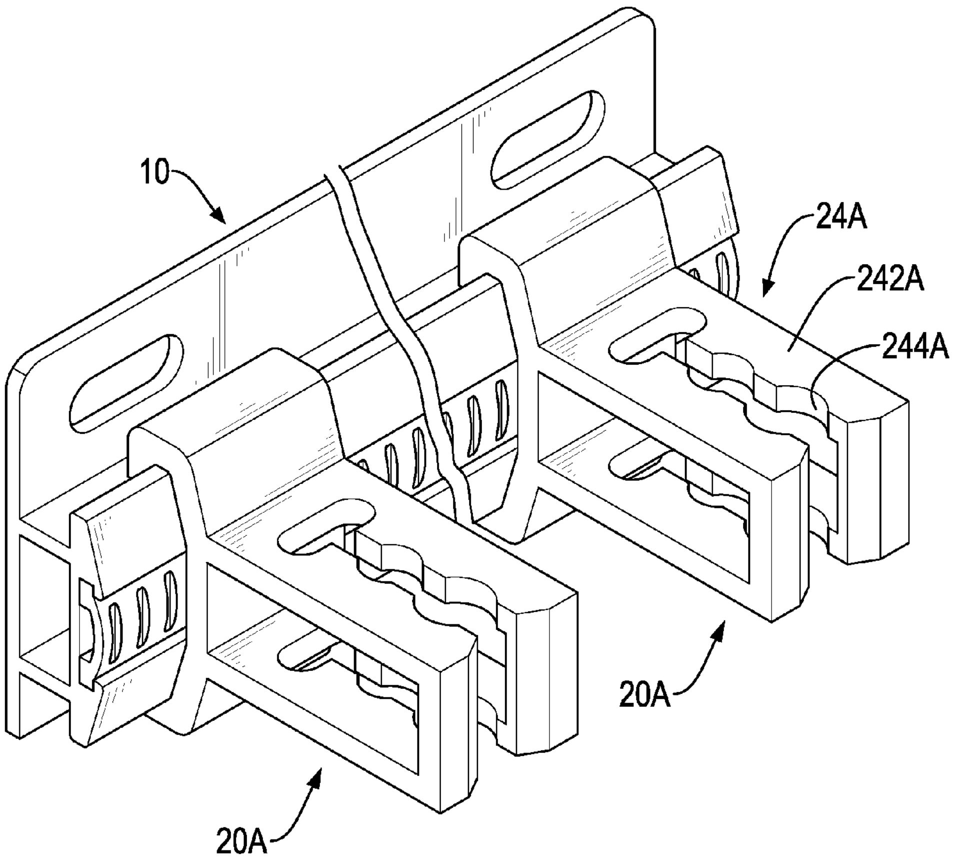
FIG. 5 is a partial perspective view of a second embodiment of a tool-hanging rack in accordance with the present invention.
Figure 6:
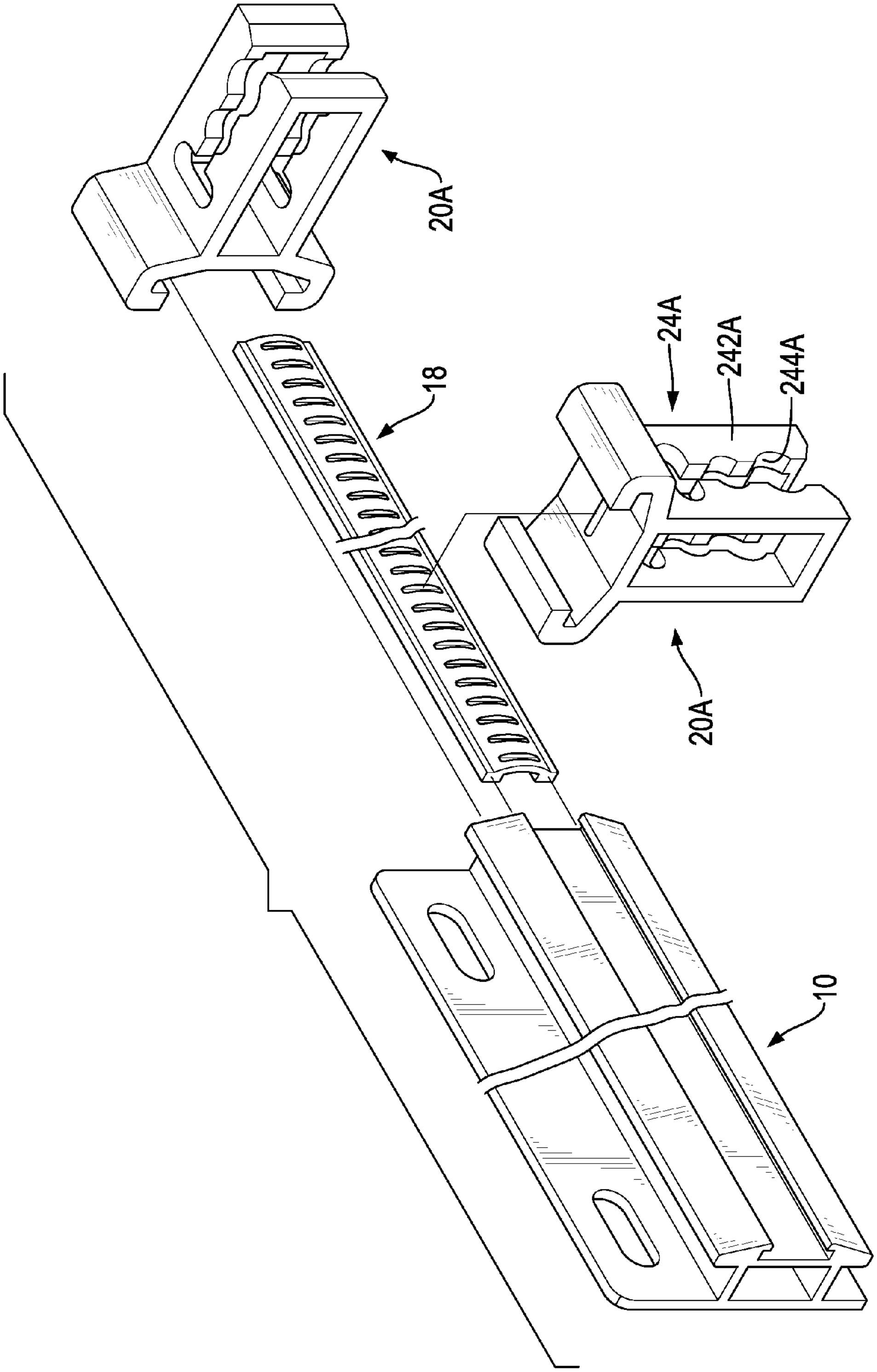
FIG. 6 is an exploded perspective view of the tool-hanging rack in FIG. 5.

With reference to FIGS. 5 and 6, in the second embodiment, the mounting segment 24A of each tool mount 20A is hollow and has two clamping arms 242A. Two sides of the two clamping arms 242A face each other and each clamping arm 242A has a clamping recess 244A defined in the side of the clamping arm 242A. Accordingly, a tool can be clamped in the clamping recesses 244A in the clamping arms 242A as shown in FIG. 14.

Figure 7:
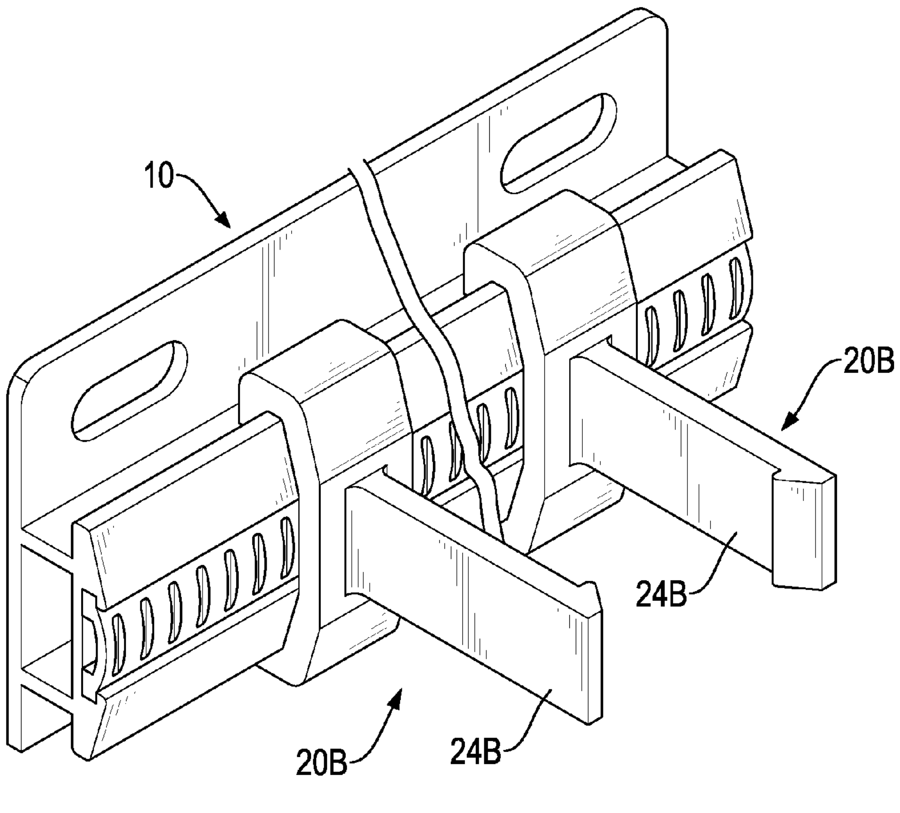
FIG. 7 is a partial perspective view of a third embodiment of a tool-hanging rack in accordance with the present invention.
Figure 8:
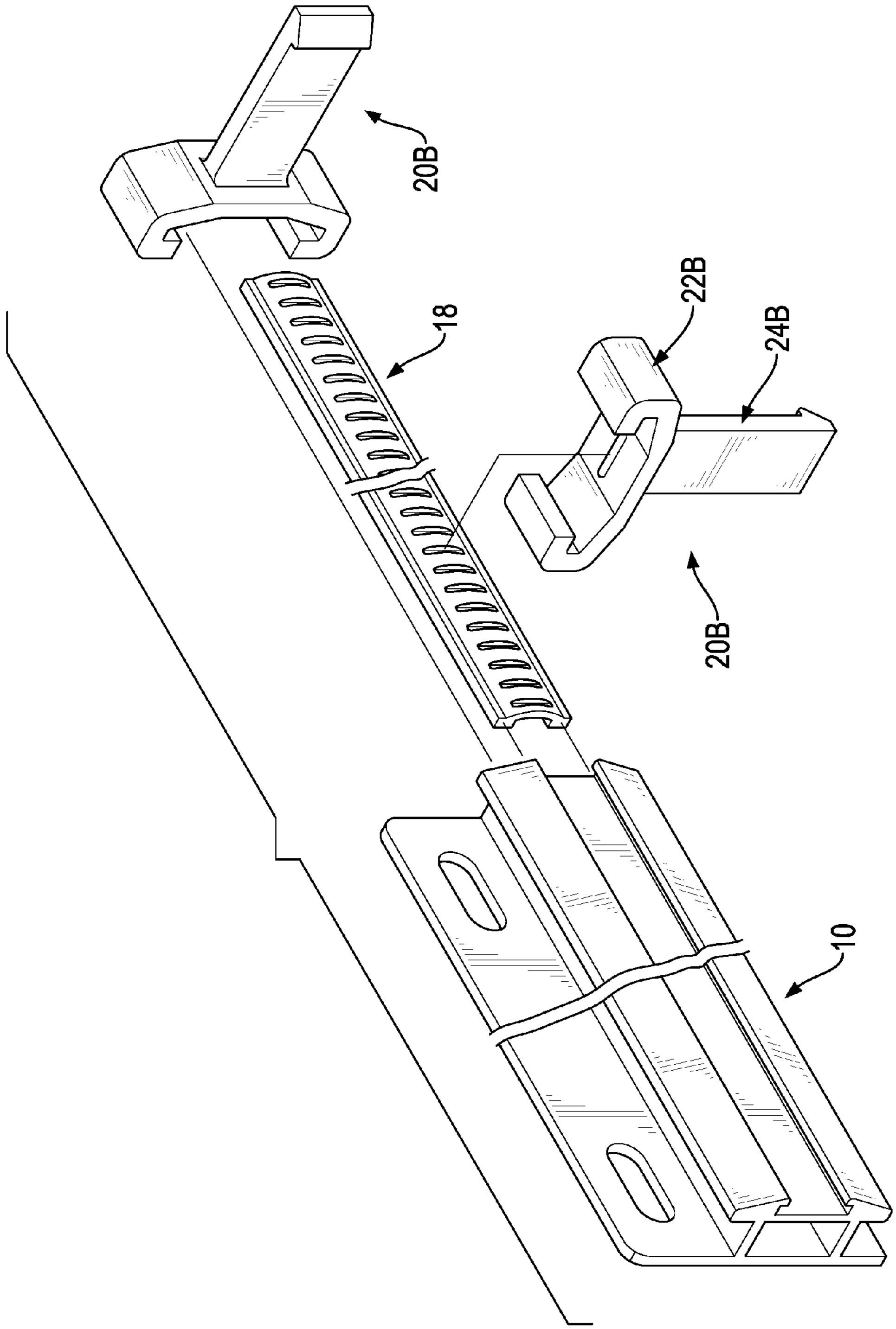
FIG. 8 is an exploded perspective view of the tool-hanging rack in FIG. 7.

With reference to FIGS. 7 and 8, in the third embodiment, the mounting portion 24B of each too mount 20B is a strip having a free end provided with a hook. Accordingly, a large tool, such as a wrench can be held and clamped between adjacent tool mounts 20B.

Figure 9:
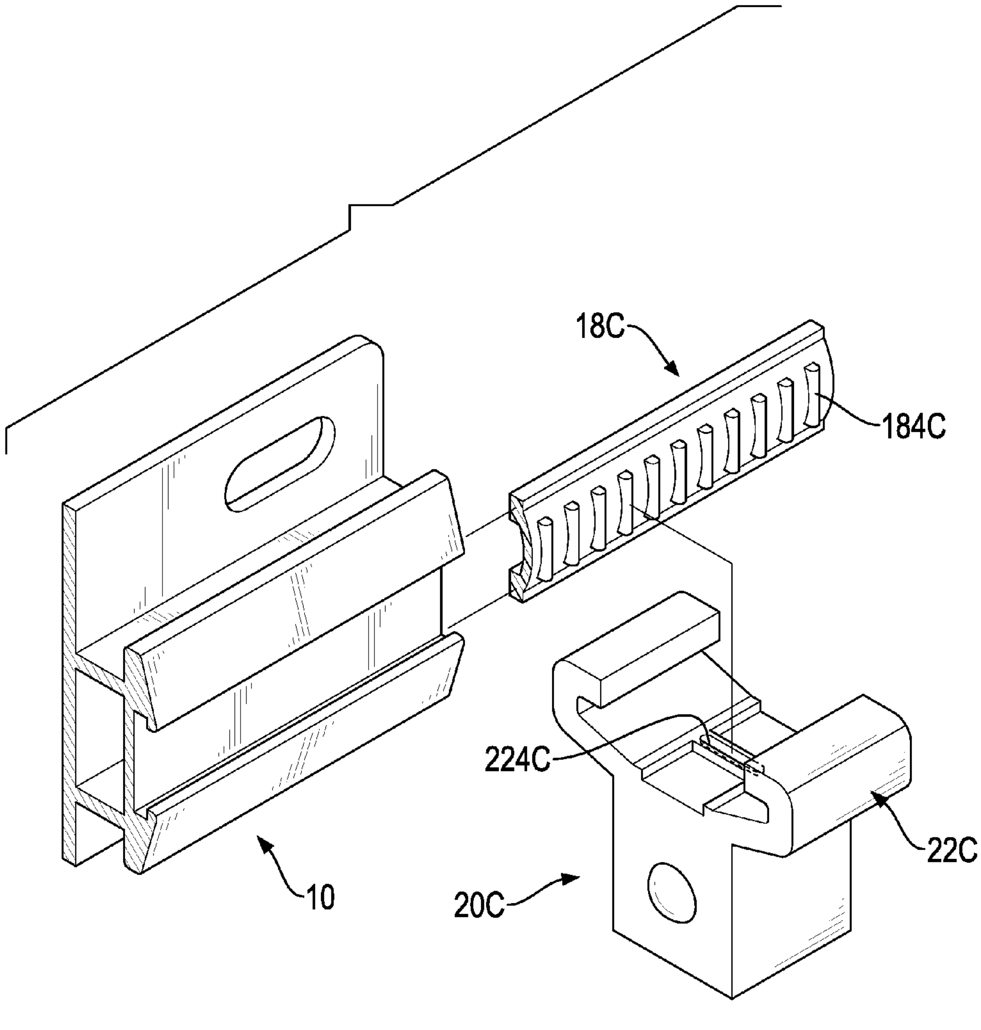
FIG. 9 is a partially exploded perspective view of a fourth embodiment of a tool-hanging rack in accordance with the present invention.
Figure 10:
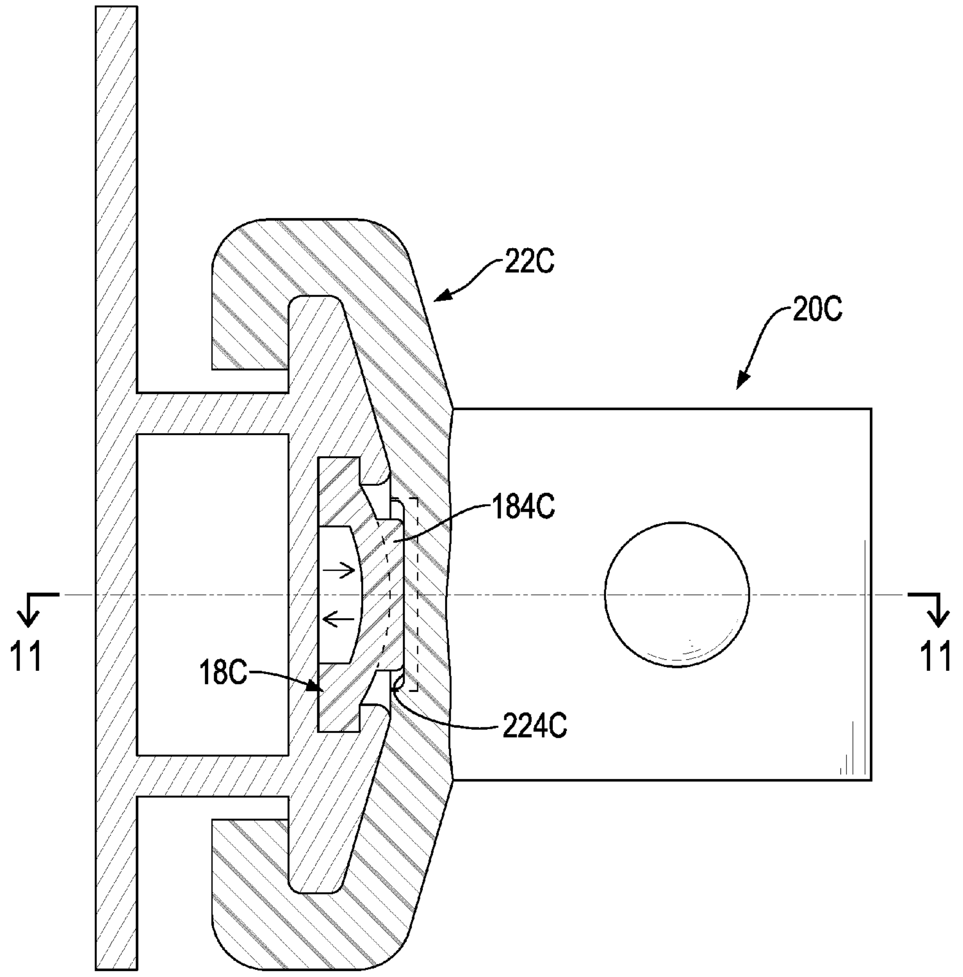
FIG. 10 is an enlarged side view in partial section of the tool-hanging rack in FIG. 9.
Figure 11A:
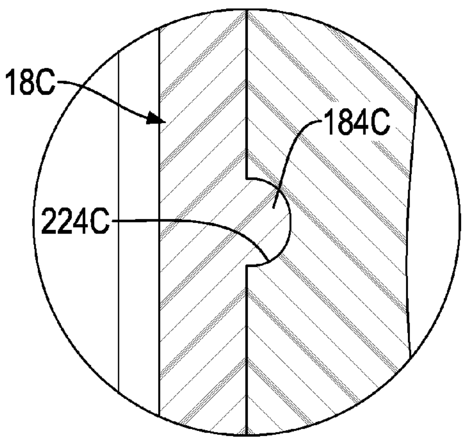
FIG. 11A is an enlarged cross sectional top view of the tool-hanging rack in FIG. 11.
Figure 11:
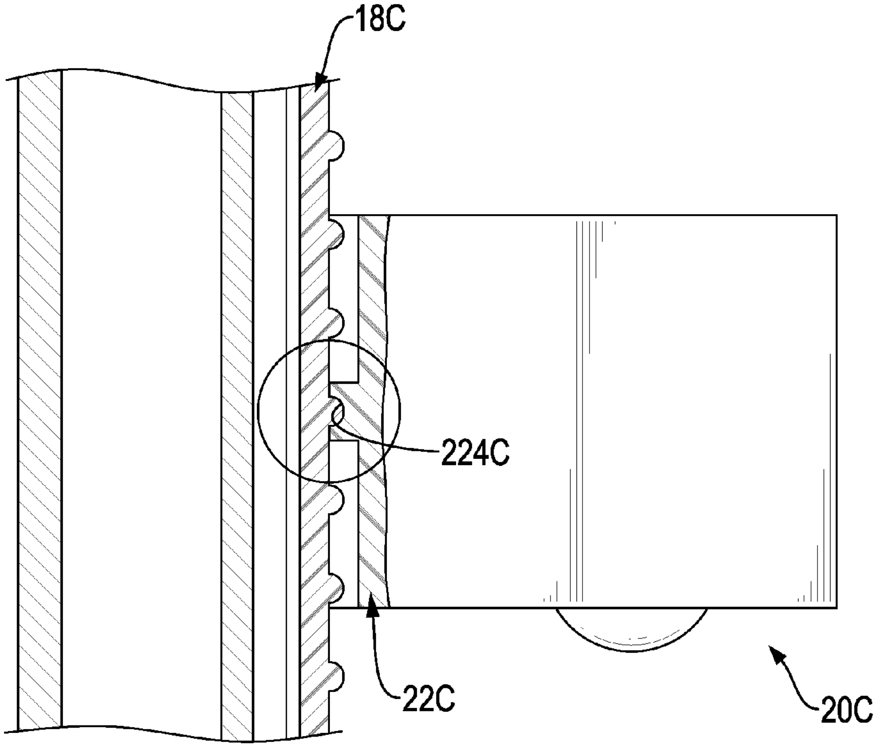
FIG. 11 is an enlarged top view in partial section of the tool-hanging rack along the line 11-11 in FIG. 10.

With reference to FIGS. 9 to 11, in the fourth embodiment, each first engaging portion 184C on the positioning board 18C is an elongated rib, and the second engaging portion 224C on each tool mount 20C is an elongated recess. With the engagement between the second engaging portion 224C on each tool mount 20C with one of the first engaging portions 184C on the positioning board 18C, the tool mounts 20C can be firmly positioned on the rail frame 10 at spaced intervals.

Figure 12:
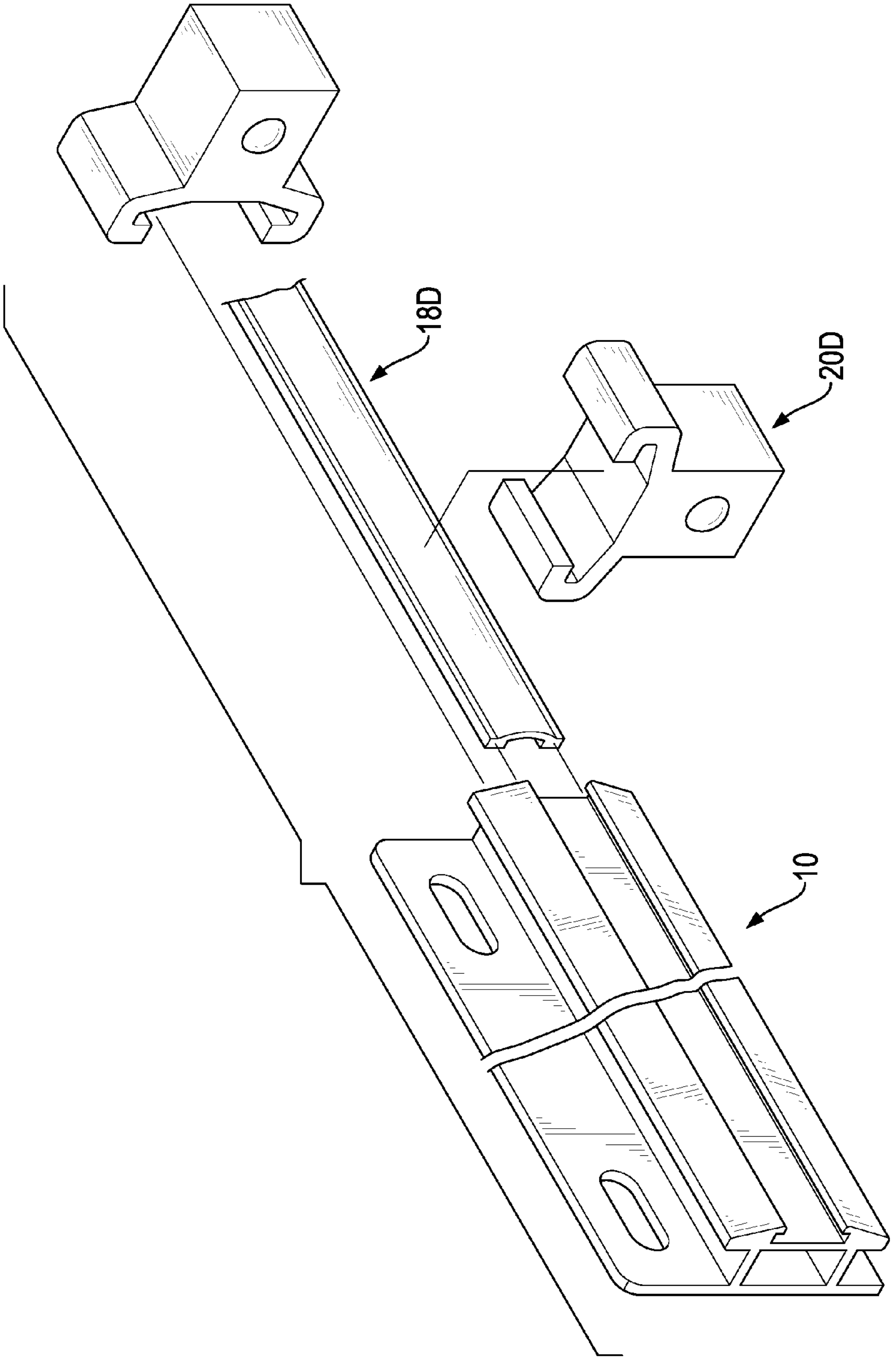
FIG. 12 is a partially exploded perspective view of a fifth embodiment of a tool-hanging rack in accordance with the present invention.
Figure 13:
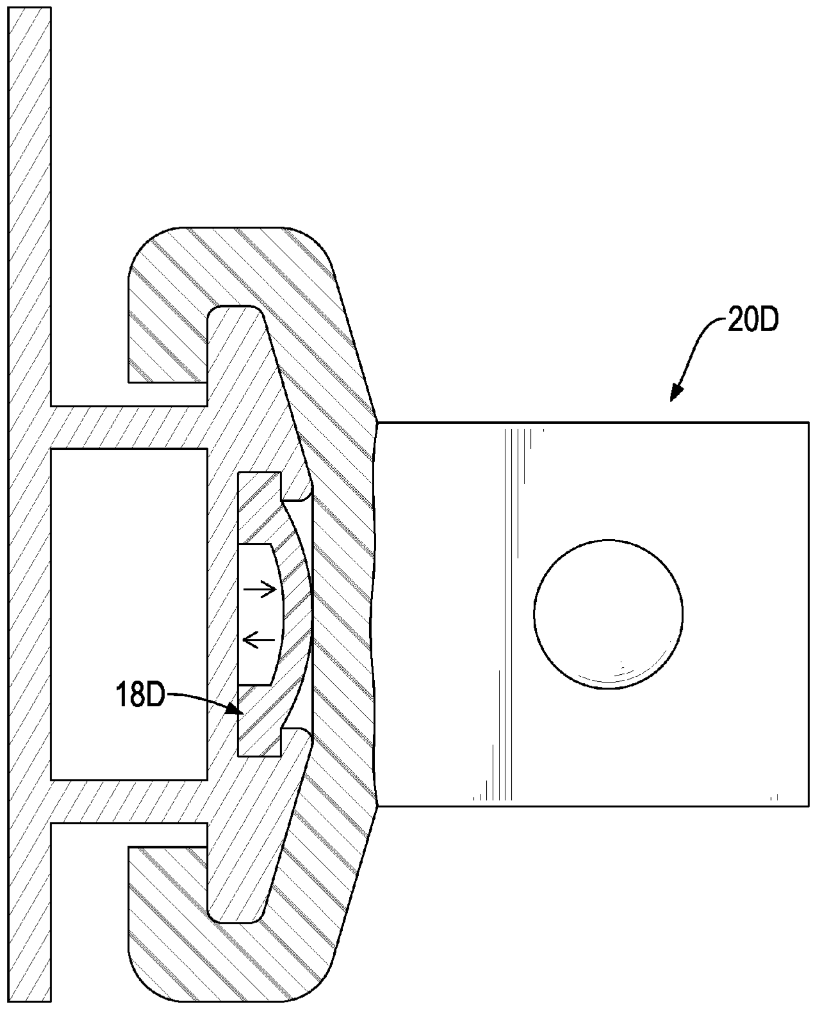
FIG. 13 is an enlarged end view in partial section of the tool-hanging rack in FIG. 12.

With reference to FIGS. 12 and 13, in the fifth embodiment, the positioning board 18D and the tool mounts 20D are free from the engaging portions. The tool mounts 20D can be also firmly positioned due to the pushing force provided by the positioning board 18D to the rails 14.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rail frame of a tool-hanging rack comprising:
a back plate;
two rails disposed on a side face of the back plate and being parallel with each other, each rail comprising
a connecting segment having a first end connected with the side face of the back plate and a second end opposite the first end; and
a rail segment connected with the second end of the connecting segment and having a side face facing the side face of the rail segment of the other rail, the rail segment having a positioning groove defined in the side face of the rail segment and extending along a longitudinal direction of the rail; and
a positioning board mounted in the positioning grooves in the two rails and being capable of providing a pushing force to the rails to keep the rails from moving toward each other.

2. The rail frame as claimed in claim 1, wherein the back plate further has a supporting board mounted between and connected with the rails.

3. The rail frame as claimed in claim 2, wherein the positioning board has a curved cross section, two side edges and two rail ribs, the two rail ribs formed respectively on the side edges of the positioning board and mounted respectively in the positioning grooves in the two rails.

4. The rail frame as claimed in claim 3, wherein the positioning board further has multiple engaging portions formed on a side of the positioning board opposite the back plate and aligned at spaced intervals.

5. The rail frame as claimed in claim 1, wherein the positioning board has a curved cross section, two side edges and two rail ribs, the two rail ribs formed respectively on the side edges of the positioning board and mounted respectively in the positioning grooves in the two rails.

6. The rail frame as claimed in claim 5, wherein the positioning board further has multiple engaging portions formed on a side of the positioning board opposite the back plate and aligned at spaced intervals.

7. A tool-hanging rack comprising:
a rail frame comprising
a back plate;
two rails disposed on a side face of the back plate and being parallel with each other, each rail comprising
a connecting segment having a first end connected with the side face of the back plate and a second end opposite the first end; and
a rail segment connected with the second end of the connecting segment and having a side face facing the side face of the rail segment of the other rail, the rail segment having a positioning groove defined in the side face of the rail segment and extending along a longitudinal direction of the rail; and
a positioning board mounted in the positioning grooves in the two rails and being capable of providing a pushing force to the rails to keep the rails from moving toward each other; and
at least one tool mount mounted slidably on the two rails of the rail frame.

8. The tool-hanging rack as claimed in claim 7, wherein the back plate further has a supporting board mounted between and connected with the rails.

9. The tool-hanging rack as claimed in claim 8, wherein the positioning board has a curved cross section, two side edges and two rail ribs, the two rail ribs formed respectively on the side edges of the positioning board and mounted respectively in the positioning grooves in the two rails.

10. The tool-hanging rack as claimed in claim 9, wherein the positioning board further has multiple first engaging portions formed on a side of the positioning board opposite the back plate and aligned at spaced intervals; and each one of the at least one tool mount has a second engaging portion formed on the tool mount and selectively engaged with one of the first engaging portions on the positioning board.

11. The tool-hanging rack as claimed in claim 10, wherein each first engaging portion is an elongated recess; and the second engaging portion of each one of the at least one tool mount is an elongated rib.

12. The tool-hanging rack as claimed in claim 10, wherein each first engaging portion is an elongated rib; and the second engaging portion of each one of the at least one tool mount is an elongated recess.

13. The tool-hanging rack as claimed in claim 7, wherein the positioning board has a curved cross section, two side edges and two rail ribs, the two rail ribs formed respectively on the side edges of the positioning board and mounted respectively in the positioning grooves in the two rails.

14. The tool-hanging rack as claimed in claim 13, wherein the positioning board further has multiple first engaging portions formed on a side of the positioning board opposite the back plate and aligned at spaced intervals; and each one of the at least one tool mount has a second engaging portion formed on the tool mount and selectively engaged with one of the first engaging portions on the positioning board.

15. The tool-hanging rack as claimed in claim 14, wherein each first engaging portion is an elongated recess; and the second engaging portion of each one of the at least one tool mount is an elongated rib.

16. The tool-hanging rack as claimed in claim 14, wherein each first engaging portion is an elongated rib; and the second engaging portion of each one of the at least one tool mount is an elongated recess.

17. The tool-hanging rack as claimed in claim 7, wherein the positioning board further has multiple first engaging portions formed on a side of the positioning board opposite the back plate and aligned at spaced intervals; and each one of the at least one tool mount has a second engaging portion formed on the tool mount and selectively engaged with one of the first engaging portions on the positioning board.

18. The tool-hanging rack as claimed in claim 17, wherein each first engaging portion is an elongated recess; and the second engaging portion of each one of the at least one tool mount is an elongated rib.

19. The tool-hanging rack as claimed in claim 17, wherein each first engaging portion is an elongated rib; and the second engaging portion of each one of the at least one tool mount is an elongated recess.

* * * * *